US005586065A

United States Patent [19]

Travis

[11] Patent Number: 5,586,065

[45] Date of Patent: Dec. 17, 1996

[54] METHOD AND APPARATUS FOR MINIMIZING AIRCRAFT CABIN NOISE

[75] Inventor: Matt H. Travis, Fall City, Wash.

[73] Assignee: The Boeing Company, Seattle, Wash.

[21] Appl. No.: 252,583

[22] Filed: May 31, 1994

[51] Int. Cl.[6] .................................................. H04B 15/00

[52] U.S. Cl. ......................... 364/574; 364/463; 364/508; 364/424.012; 244/1 N

[58] Field of Search .................................... 364/463, 574, 364/508, 424.01; 381/71, 94; 73/460–462, 468–470, 455, 457, 458, 660, 583; 464/180; 244/1 N, 195, 53 R; 415/118, 119

[56] References Cited

U.S. PATENT DOCUMENTS

| | | | |
|---|---|---|---|
| 4,015,480 | 4/1977 | Giers | 73/462 |
| 4,162,634 | 7/1979 | Hofmann | 73/462 |
| 4,238,960 | 2/1980 | Curtis et al. | 73/462 |
| 4,463,453 | 7/1984 | Cohen et al. | 367/135 |
| 4,485,678 | 12/1984 | Fanuele | 73/660 |
| 4,488,240 | 12/1984 | Kapadia et al. | 364/508 |
| 4,510,809 | 4/1985 | Fillion | 73/457 |
| 4,513,619 | 4/1985 | Widdall | 73/455 |
| 4,520,674 | 6/1985 | Canada et al. | 73/660 |
| 4,608,650 | 8/1986 | Kapadia | 364/508 |
| 4,667,532 | 5/1987 | Holz et al. | 174/573 R |
| 4,689,821 | 8/1987 | Salikuddin et al. | 381/71 |
| 4,715,559 | 12/1987 | Fuller | 244/1 N |
| 4,885,707 | 12/1989 | Nichol et al. | 364/551.01 |
| 4,947,356 | 8/1990 | Elliott et al. | 364/574 |
| 4,977,516 | 12/1990 | Shepherd | 364/508 |
| 5,011,374 | 4/1991 | Miller | 416/144 |
| 5,148,402 | 9/1992 | Magliozzi et al. | 364/574 |
| 5,172,325 | 12/1992 | Heidari | 364/463 |
| 5,197,010 | 3/1993 | Andersson | 73/457 |
| 5,277,063 | 1/1994 | Thomas | 73/457 |
| 5,423,658 | 6/1995 | Pla et al. | 244/1 N |

FOREIGN PATENT DOCUMENTS 2237415 5/1991 United Kingdom .

OTHER PUBLICATIONS

K. R. Piety et al., ". . . for the Power Generation Industry," *Sound and Vibration*, Jun. 1986, pp. 18–21.

*Primary Examiner*—Emanuel T. Voeltz
*Assistant Examiner*—Hal P. Wachsman
*Attorney, Agent, or Firm*—Christensen, O'Connor, Johnson & Kindness PLLC

[57] ABSTRACT

Aircraft cabin noise and engine vibration are monitored at selected cabin and engine locations (51*a*/51*b*), respectively. An optimizing equation uses aircraft cabin noise information to separately determine for each engine a balance solution (60) that minimizes aircraft cabin noise at the selected cabin locations over the engine RPM range of interest. Next, the balance solutions are used to predict the engine vibration levels (63) that will be produced if the balanced solution is implemented. Then a test (65) is made to determine if the predicted engine vibration levels are acceptable, i.e., below a predetermined level. If acceptable, the balance solutions are used to select balance weights suitable for the engines being balanced (66) and the result displayed (67) for implementation by engine maintenance personnel. If the predicted vibration level is unacceptable, a new balance solution is determined for each engine (68) using the optimizing equation constrained by the allowable vibration level.

24 Claims, 4 Drawing Sheets

METHOD AND APPARATUS FOR MINIMIZING AIRCRAFT CABIN NOISE

TECHNICAL AREA

The present invention relates to vehicle cabin noise and, more particularly, to a method and apparatus for minimizing vehicle (e.g., aircraft) cabin noise caused by the imbalance of the engines of the vehicle.

BACKGROUND OF THE INVENTION

As will be readily understood from the following description, while the present invention was developed for use in minimizing aircraft cabin noise potentially, the invention can be used in any type of vehicle to minimize any objectionable environmental parameters, including noise, in the cabin of the vehicle created by the imbalance of the engine(s) powering the vehicle.

One of the annoyances of modern air travel is the level of noise in an aircraft cabin during flight. Annoying aircraft cabin noise comes in two forms—audible form and tactile form. The audible form of noise is the sound pressure level heard by the passenger and crew of the aircraft. The tactile form of noise is the vibration felt by passengers and crew. As used in this application the word noise is intended to cover audible noise, or tactile noise, or both.

Excessive noise levels can cause aircraft passenger and crew discomfort. One source of aircraft cabin noise is engine vibration. Engine vibration is transferred through aircraft structure into the cabin of the aircraft and manifests itself as cabin noise. In addition to causing passenger and crew discomfort, engine vibration can decrease the efficiency of an engine, significantly reduce engine life, and increase engine maintenance costs.

To fully understand engine vibration, it is necessary to understand the operation of the jet engines that power modem aircraft. Most modem commercial aircraft are powered by high-bypass jet engines. High-bypass jet engines have a large number of rotating elements. The rotating elements can be grouped accordingly to the relative speed of rotation. Some of the rotating elements form a low-speed rotating system and some of the rotating elements form a high-speed rotating system. While, during in-flight operation, both the low-speed rotating system and the high-speed rotating system can be a source of unwanted engine vibration, the primary source of passenger and crew discomfort is the low-speed rotating system.

Engine vibration is caused by an imbalance in the rotating system producing the vibration. In order to reduce structurally transmitted vibration, engine manufacturers have modified the locations where engine vibration is transferred from the rotating system causing the vibration to the air frame of the aircraft. These solutions to the engine vibration problem include the use of damped bearings and vibration isolators.

Another way of reducing structurally transmitted vibration that has been implemented by aircraft operators in the past is to balance the rotating systems of aircraft engines on a regular basis. Engine balancing is well known in the aircraft art. It involves the attachment of weights at specific locations on the rotating system to be balanced. In many respects, the balancing of a high-bypass jet engine is analogous to the balancing on an automobile tire prior to mounting the tire on an automobile. Placing weights of specific mass at specific radial locations along the axis of a rotating system considerably reduces the vibration of the rotating system and, thus, the noise created by the vibration. The specification of the location and amount of weight to be applied to the rotating system in order to balance the rotating system is referred to as the balance solution for the rotating system.

In order to determine balance solutions for the rotating systems of aircraft engines, it is necessary to obtain vibration data. Vibration data is a measure of the amount of vibration that an engine is producing at various locations as the engine is operated at various speeds. Until recently, vibration data was gathered at an engine balancing facility located on the ground. More recently, engine vibration data has been gathered during flight. Regardless of how gathered, after vibration data is obtained, the vibration data is used to obtain a balance solution that attempts to minimize the vibration of the engine producing the data.

Unfortunately, all of the prior art methods used to obtain balance solutions operate under the assumption that minimizing engine vibration will also minimize cabin noise. This assumption is flawed for two reasons. First, only two locations are monitored on current engine designs. Many more than two locations would be required to cover all of the load paths an engine can use to transmit energy into the cabin. Minimization of vibration levels at only two locations does not necessarily mean that an engine is considered well balanced. Second, unbalances can lie along the interior length of the low rotor at planes that are not coincident with the fan and the last stage of the turbine. These unbalances can be due to interior blade unbalances in the engine stack up and also to rotor shaft coupling and bearing misalignments. It is not possible to completely balance an engine with access to only the exterior of the engine (i.e., the fan and last stage of the turbine). Engine balancing, therefore, is always a compromise because different balance solutions have different effects on vibration at different engine speeds, and at different locations. The criteria for success in balancing depends on how much of the dynamic picture of an engine one chooses to view. Because of the foregoing and other dynamic factors, minimizing engine vibration does not always directly correlate with minimizing aircraft cabin noise.

SUMMARY OF THE INVENTION

In accordance with the present invention, an improved method and apparatus for reducing passenger discomfort by taking into account actual aircraft cabin noise as well as engine vibration is provided. More specifically, in accordance with this invention, aircraft cabin noise and engine vibration are both monitored at selected cabin and engine locations, respectively. An optimizing equation uses the monitored aircraft cabin noise data to separately determine for each engine a balance solution that will minimize aircraft cabin noise at the selected cabin locations. Next, the balance solutions are used to predict the engine vibration that will be produced if the balance solutions are implemented. Then a test is made to determine if the predicted engine vibration levels are acceptable, i.e., below a predetermined level. This acceptable level may be based on allowable EBU (engine build-up units) vibration to insure component life, and overall engine health considerations. If acceptable, the balance solutions are used to select balance weights suitable for the engines being balanced and the result displayed for implementation by engine maintenance personnel. If the predicted engine vibration levels are unacceptable, a new balance solution is determined for each engine using the optimizing equation constrained by the allowable vibration level. The monitored cabin noise can be limited to audible noise or tactile noise, or can include both types of noise.

In accordance with other aspects of this invention, the optimizing equation sums corrective balance weight noise data with monitored cabin noise data to produce predicted cabin noise data. Corrective balance weight noise data is incrementally changed, both as to amount and angular position, until predicted cabin noise data is minimized. Preferably, the optimizing equation has the form: PCN=MCN+IC·CW, where: PCN is predicted cabin noise; MCN is monitored cabin noise; IC is an influence coefficient determined by dividing a change in noise response by a change in unbalance; and CW is corrective balance weight.

In accordance with further aspects of this invention, only low-speed rotating system engine vibration is monitored, preferably by conventional airborne vibration monitors (AVMs), which include accelerometers mounted in the engines and electronic circuits that typically convert the accelerometer signals into velocity or displacement signals. The units output by the AVM system are irrelevant, since the invention can be practiced using acceleration, velocity, or displacement signals.

In accordance with yet other aspects of this invention, audible aircraft cabin noise is monitored by microphones, which detect sound pressure. Cabin tactile vibration, where applicable, is monitored by cabin accelerometers located in the vicinity of the undesirable vibration (often at wing center section seats over the wing spar).

In accordance with other further aspects of the invention, the signals produced by the accelerometers and the microphones are convened from analog form into digital form, and an order tracked fast-Fourier transformation is used to eliminate all noise coming from the engines that is nonsynchronous with the tone produced by the low-speed rotation system of the engine being monitored and to obtain a measurement of the tone with minimized discrete Fourier transform leakage.

In accordance with still further aspects of this invention, the optimizing equation used to obtain the balance solution has the form:

$$C_i=C^*_i+N_i^f\cdot FAN+N_i^l\cdot LPT \qquad (1)$$

where $C_i$ is the predicted noise at location i in the cabin of the aircraft; $C^*_i$ is the measured noise level at location i; $N_f^i$ is the noise influence coefficient at location i due to a unit FAN imbalance; and $N_i^l$ is the noise influence coefficient at location i due to a unit LPT imbalance. FAN and LPT in the equation are fan and low-pressure turbine (LPT) balance weights each at their own independent angular position. That is, FAN is the pan of the balance solution relating to the fan of the region, and LPT is the pan of the balance solution relating to the low-pressure turbine, sometimes called the low-speed rotor, of the engine. The noise influence coefficients are defined as a change in the response of the parameter divided by a change in engine unbalance. If the parameter is audible aircraft noise, the noise influence coefficient is defined as a change in sound pressure response (in actual magnitude, not in decibels) divided by a change in engine unbalance. If the parameter is cabin tactile vibration, the noise influence coefficient is defined as a change in cabin vibration response divided by a change in engine unbalance.

In accordance with yet further aspects of the invention, the equation used to predict engine vibration levels based on the balance solution has the form:

$$D_j=D^*_j+R_j^f\cdot FAN+R_j^l\cdot LPT \qquad (2)$$

where $D_j$ is the predicted AVM vibration level at location j of the engine whose vibration is being predicted: $D^*_j$ is the measured AVM vibration level at location j; $R_j^f$ is the AVM vibration influence coefficient at location j due to unit FAN imbalance; and $R_j^f$ is the AVM vibration influence coefficient at location j due to unit LPT imbalance. The AVM vibration influence coefficients are defined as a change in AVM (displacement) response divided by a change in engine unbalance.

In accordance with other further aspects of this invention, the constraint placed on the equation used to predict engine vibration levels is the allowable AVM vibration level ($D_a$).

In accordance with yet still further aspects of this invention, new influence coefficients ($N_i^f$, $N_i^l$, $R_{jf}$ and $R_j^l$) are computed each time new balance weights are added to an engine. As noted above, the influence coefficients are the change in response (sound pressure or displacement) divided by the change in unbalance. By averaging these new coefficients with those previously stored in a database the accuracy of the influence coefficients is improved and a measure of any statistical deviation can be tracked.

As will be readily appreciated from the foregoing description, rather than balancing engines in a manner designed to minimize vibration as measured at the AVMs, the present invention balances engines in a manner designed to minimize aircraft cabin noise. In some instances, the implementation of the present invention could result in an increase in engine vibration over some rpm ranges. A constraint is placed on engine imbalance in order to prevent such imbalance from exceeding a predetermined level, even though this could result in a further decrease in cabin noise.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Prior to describing the presently preferred embodiment of the invention, a brief description of a high-bypass jet engine of the type commonly used to power modern commercial aircraft is described followed by a brief description of electronic circuitry suitable for converting the signals produced by accelerometers mounted on an aircraft engine to detect engine vibration into displacement signals.

Figure 1:
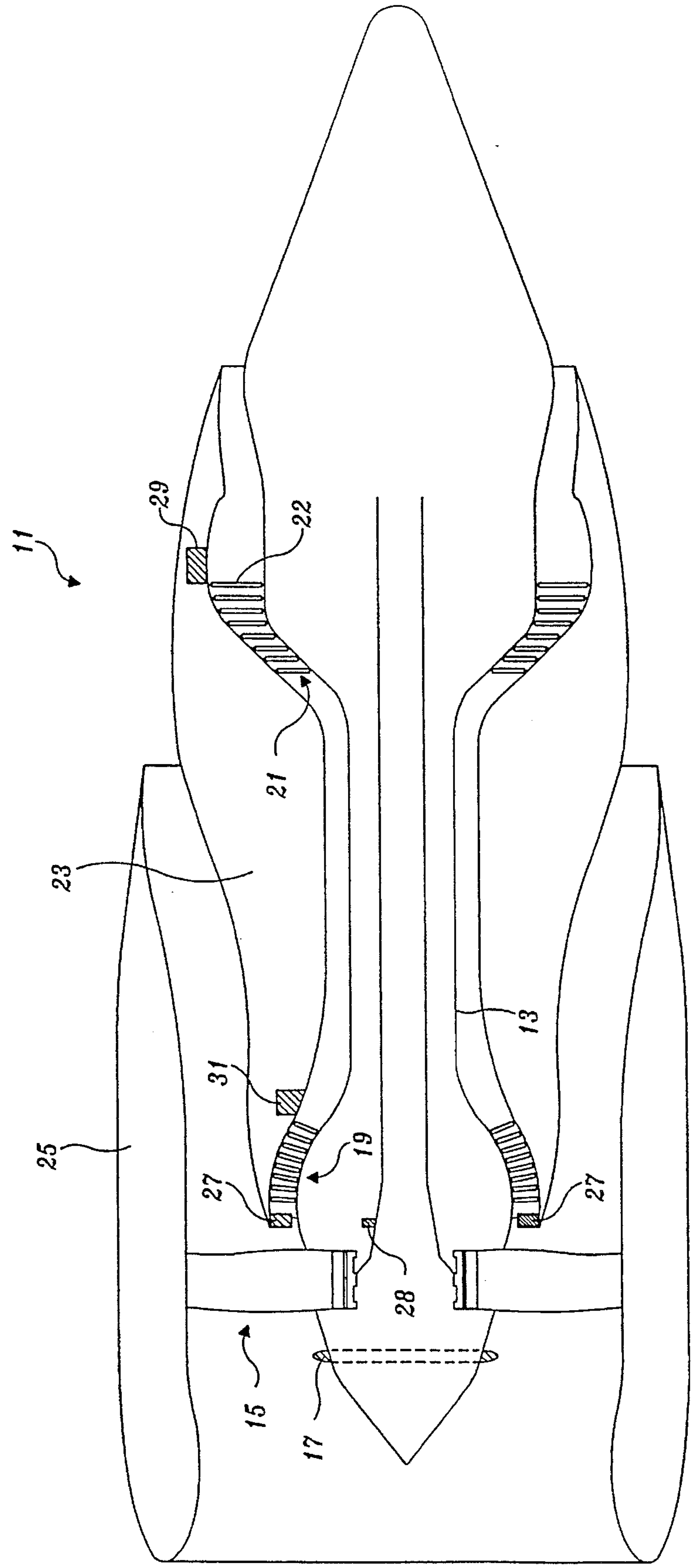
FIG. 1 is a side cut-away pictorial diagram of a typical high-bypass jet engine of the type used to power commercial aircraft.
Figure 2:
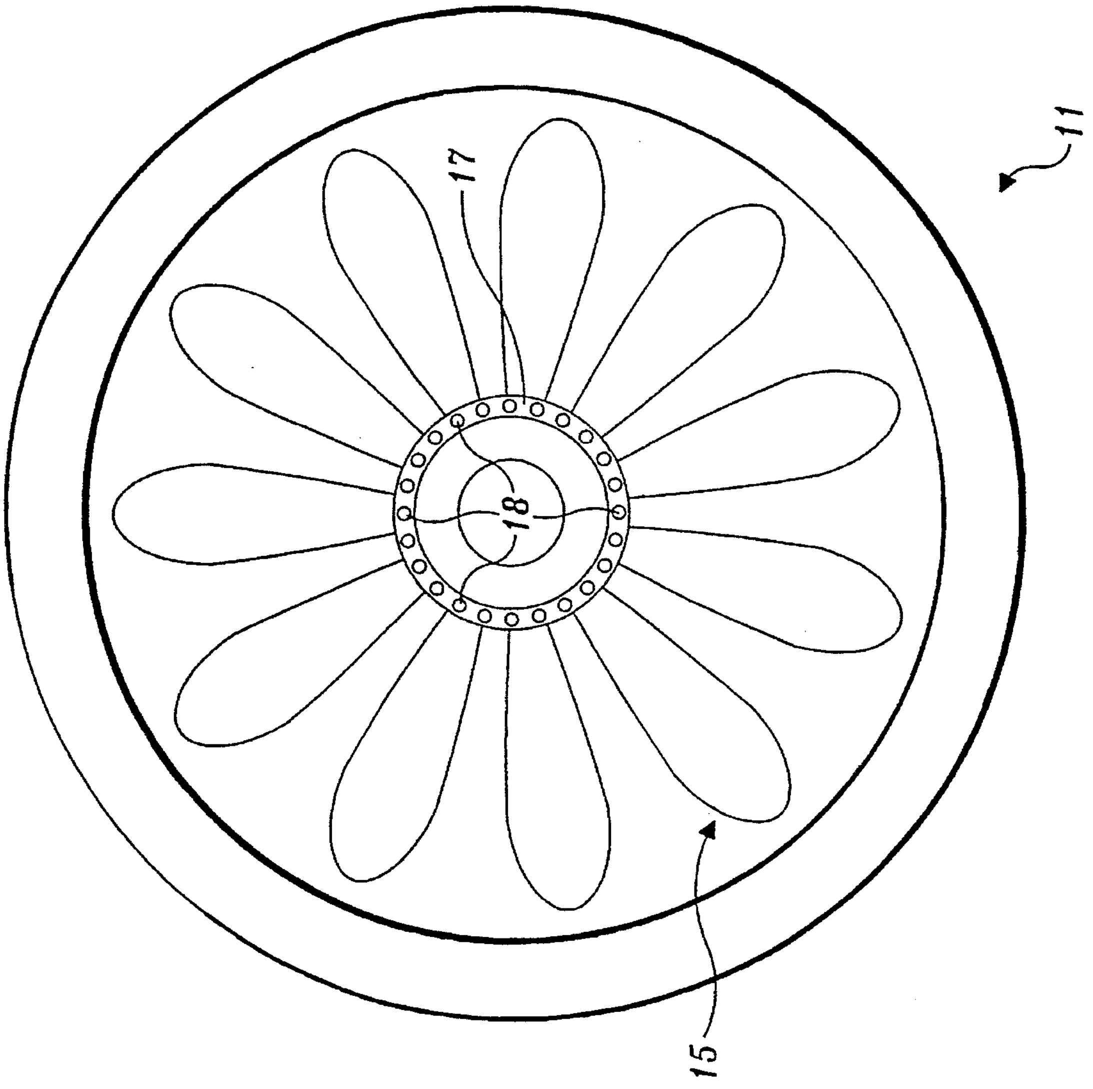
FIG. 2 is a front view of the jet engine illustrated in FIG. 1.

FIGS. 1 and 2 pictorially illustrate a high-bypass jet engine 11 that includes a low-speed rotating system comprising a low-speed shaft 13, a fan 15, a fan balance ring 17, a low-pressure compressor 19, and a low-pressure turbine 21. The engine 11 also includes a high-speed rotating system, which is not shown. The present invention is concerned only with the low-speed rotating system because current engine designs make the high-speed rotor inaccessible for balance weight placement once the engine is assembled.

The fan balance ring 17 is disposed near the frontmost portion of the low-speed shaft 13 and is affixed thereto. The balance ring 17 is circular and includes a plurality of holes 18 about its circumference. As discussed more fully below, the holes 18 form receptacles for receiving balance weights. Thus, the function of the fan balance ring 17 is to receive balance weights that aid in balancing the low-speed rotating system of the engine 11.

The fan 15 of the engine 11 is disposed immediately behind the fan balance ring 17 and is comprised of a plurality of substantially identical blades that radiate outwardly from the low-speed shaft 13 at equal angular intervals. The individual blades that comprise the fan 15 are fixedly secured to the low-speed shaft 13. Disposed behind the fan 15 is the low-pressure compressor 19. The low-pressure compressor 19 consists of a plurality of compressor blades disposed adjacent one another and fixedly connected to the low-speed shaft 13.

Located near the rear end of the low-speed shaft 13 is the low-pressure turbine 21. The low-pressure turbine 21 consists of a plurality of sets of blades disposed adjacent one another and fixedly connected to the low-speed shaft 13. Current engine designs do not have a balance ring at the end of the low-pressure turbine 21; however, since the last set of blades 22 are accessible from the rear of the fully assembled engine, most engine manufacturers have designed small balance clips that can be attached to any of the blades. Because the fan balance rings 17, fan 15, low-pressure compressor 19, low-pressure turbine 21 are all connected to the low-speed shaft 13, all of these components rotate at the same speed as the low-speed shaft 13.

An engine casing 23 of generally tubular shape is disposed circumferentially about the low-pressure shaft 13, extending from the low-pressure compressor 19 backward, past the low-pressure turbine 21. The engine casing 23 surrounds that portion of the engine that lies behind the fan 15.

An engine nacelle 25 of generally tubular shape is disposed circumferentially about the fan 15, the balance ring 17, and the engine casing 23, extending from the fan 15 backward nearly to the point where the low-pressure turbine 21 is positioned. Disposed at the forward portion of the engine casing 23 is a rotor speed sensor 27. The sensor 27 provides a signal that is indicative of the rotational speed of the low-speed shaft 13. More specifically, the sensor 27 typically operates by detecting the passage of teeth on a gear fixed to the low-pressure shaft 13. One tooth on this gear 28 is typically longer (or shorter) than the other teeth. This tooth is in angular alignment with the number one fan blade and/or a dimple on the low-speed shaft 13. As the teeth of the gear pass the sensor, the sensor produces a signal having the configuration of periodic series of waveforms. One of the electronic waveforms the sensor produces is different from the others. This waveform corresponds to the odd tooth. The sensor signal is massaged electronically to produce a TTL (transistor transitor logic) pulse that can be used to track the relative instantaneous angular position of the low-speed rotor 13 in time. The rotation signal is also processed to provide an indication of the rotational speed of the low-speed shaft 13 in revolutions per minute (RPM). In particular, the speed of the low-speed shaft 13 in RPM is sixty (60) times the frequency of the rotation signal in Hertz.

Disposed on the rear portion of the engine casing 23, directly above the last set of blades 22 of the low-pressure turbine 21, is a rear accelerometer 29. The rear accelerometer 29 provides a rear acceleration signal that is indicative of the acceleration (and, thus, the vibration) of the engine casing 23 at the point where the rear accelerometer 29 is located. Disposed near the front portion of the engine casing 23, directly above the low-pressure compressor 19, is a front accelerometer 31. The front accelerometer may also be located on the forwardmost bearing supporting the low-pressure shaft 13. The front accelerometer 31 provides a front acceleration signal that is indicative of the acceleration of the engine casing 23 where the front accelerometer 31 is located. The operation of accelerometers is well known in the art; see, for example, E. O. Doebelin, *Measurement System Application and Design*, Section 4.8 (Third Ed. 1983) published by McGraw-Hill.

High-bypass jet engines of the type pictorially illustrated in FIGS. 1 and 2 and described above are well known in the aircraft art. Most modern high-bypass jet engines include all of the components illustrated in FIGS. 1 and 2 and described above, including the rotor speed sensor 27, the rear accelerometer 29, and the forward accelerometer 31. For example, the model GE90 engine manufactured by General Electric, the model PW4084 engine manufactured by Pratt & Whitney, and the model Trent 800 engine manufactured by Rolls Royce all include a rotor speed sensor, a rear accelerometer, and a-front accelerometer. Originally, the accelerometers included in aircraft engines were primarily used to provide signals to warning devices. In recent years, the signals produced by engine accelerometers have been provided to the Engine Indicator and Crew Alerting System (EICAS) of commercial jet aircraft. The EICAS alerts the crew of an engine malfunction if excessive vibration is detected. More recently, the accelerometer signals provided to the EICAS have also been utilized to provide information for use in engine balancing systems. More specifically, the accelerometer signals and electronic conditioning circuitry have been used to create airborne vibration monitors (AVMs). AVMs produce signals that, when suitably analyzed, provide data regarding the angular position and amount of weight to be applied to the jet engines of an aircraft to balance the rotating systems of the engine. The angular position and amount of weight required to balance the rotating systems of an aircraft engine is commonly called the balance solution.

The purpose of the balance solution is to reduce cabin noise as well as increase the efficiency of the engine, increase engine life, and decrease engine maintenance cost. Unfortunately, the balance solution determined by prior art systems does not always reduce aircraft noise to a minimum because factors other than engine balance are involved. As will be understood from the following description of the preferred embodiment of the invention illustrated in FIG. 4, the present invention is directed to minimizing aircraft cabin noise by taking into consideration the actual cabin noise of an aircraft produced by engine vibration.

Figure 3:
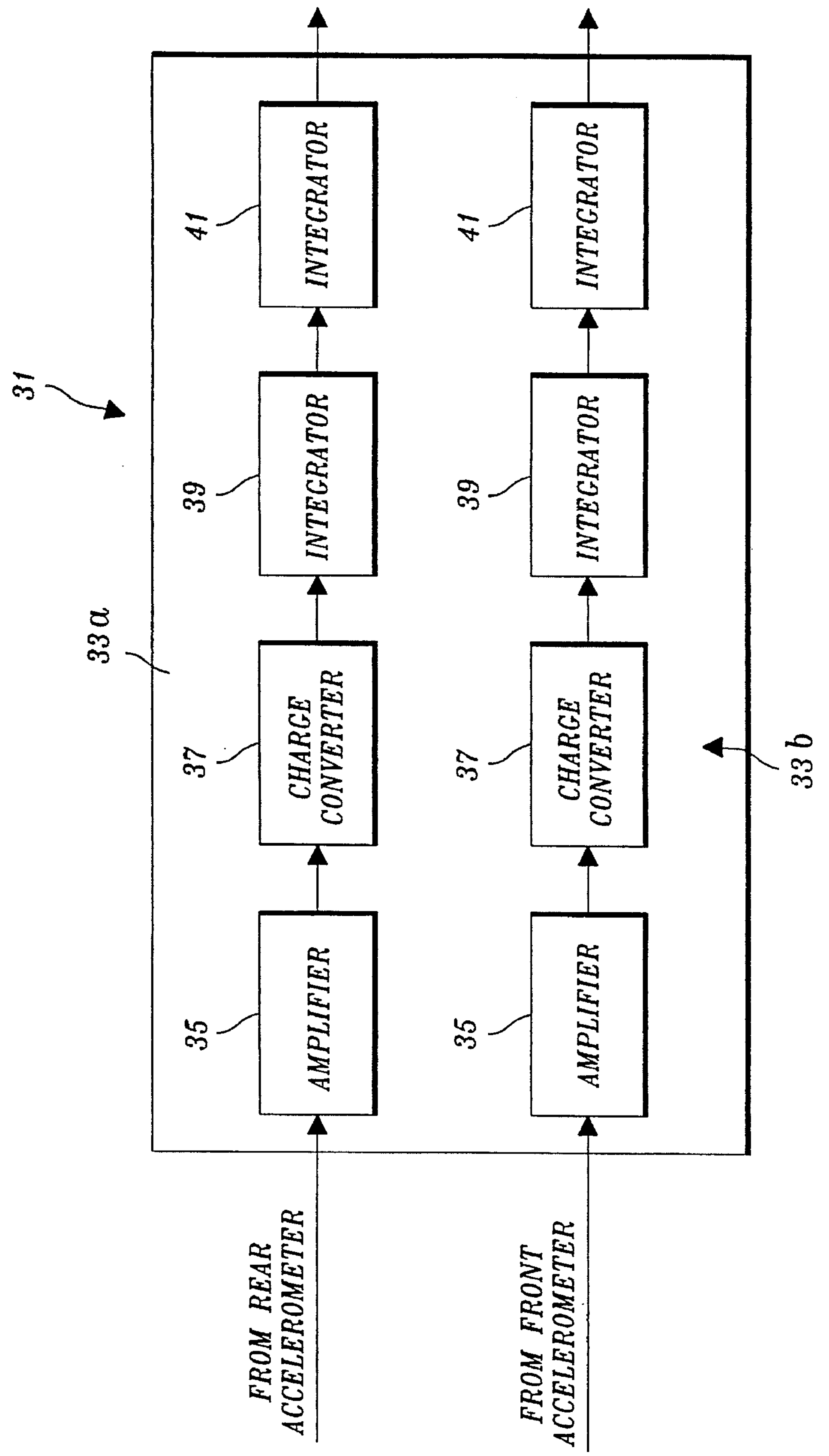
FIG. 3 is a schematic diagram of a typical signal conditioning unit included in an airborne vibration monitor (AVM) for converting accelerometer signals into velocity or displacement form.

Prior to describing the presently preferred embodiment of the invention, a brief discussion of an example of circuitry designed to convert accelerometer output into signals suitable for engine balance analysis is described. In this regard, attention is directed to FIG. 3. The signal conditioning circuitry 31 illustrated in FIG. 3 includes two channels 33*a* and 33*b*. One channel is for the rear accelerometer signal and the other channel is for the front accelerometer signal. Both channels include an amplifier 35, a charge converter 37, and in most cases first and second integrators 39 and 41.

Typically, an accelerometer is used to measure jet engine vibrations. Accelerometers such as those found in the GE90, PW4084, and Trent 800 engines provide an acceleration signal in the form of an electric charge. The level of electric charge is indicative of the amount of acceleration the accelerometer is undergoing. Thus, the amplifiers 35 amplify electric charges. The charge converters 37 convert the electric charge into voltage signals. Since the front and rear accelerometers provide signals that are indicative of acceleration, in order to obtain displacement information, it is necessary to integrate twice the acceleration signals. This is accomplished by the first and second integrators 39 and 41. Thus, the signals exiting from the second integrator 41 include displacement data that is indicative of the positional displacement of the associated accelerometer. Although the use of displacement signals derived from accelerometers is typical, as will be understood by those skilled in the technology, velocity or acceleration could also be used in actual embodiments of the present invention.

Figure 4:
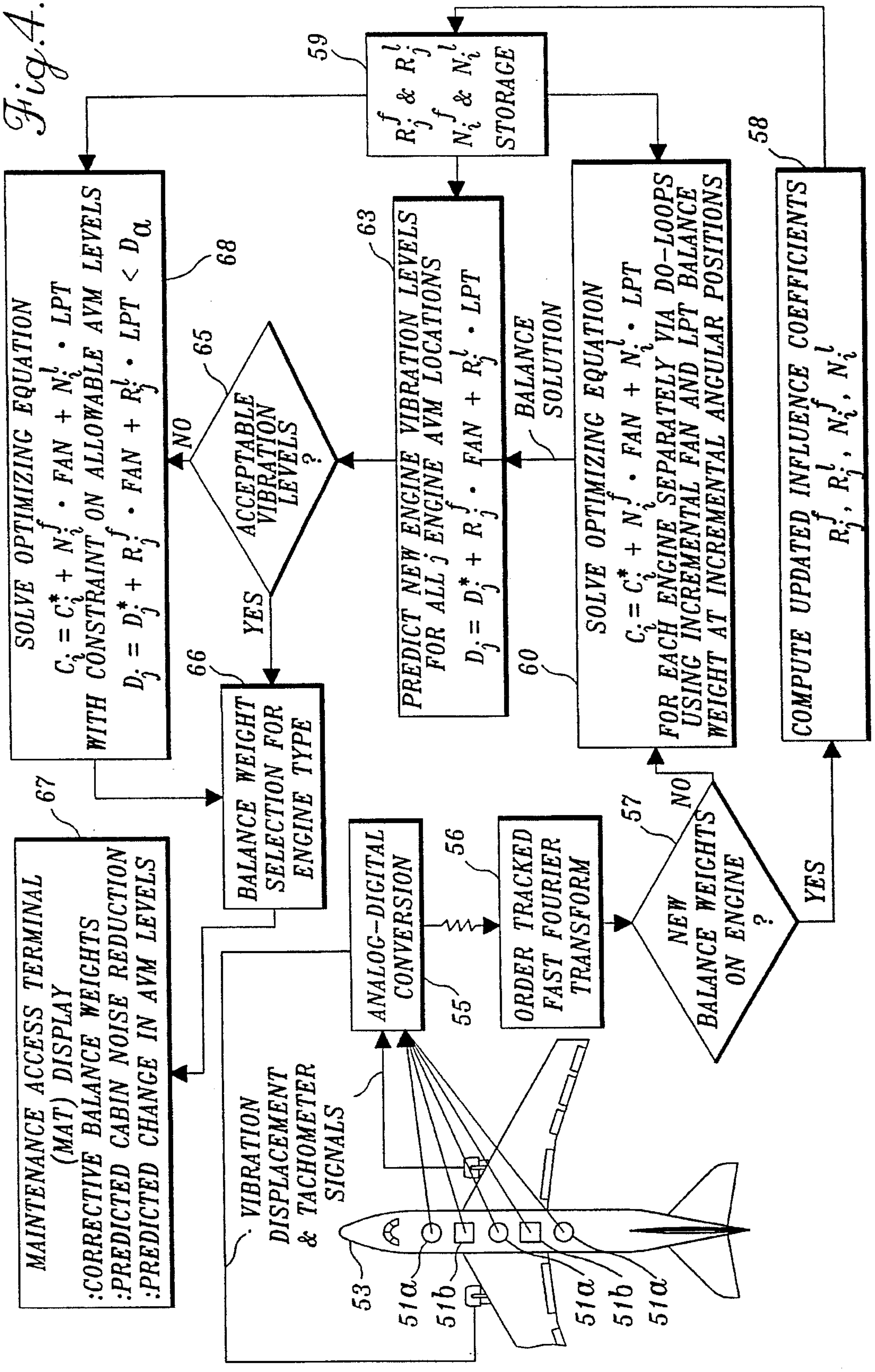
FIG. 4 is a schematic diagram of a preferred embodiment of the present invention.

FIG. 4 is a functional block diagram illustrating the method and apparatus of the invention. Preferably, in an actual embodiment of the invention, the functional blocks illustrated in FIG. 4 are implemented in microprocessor form. Thus, FIG. 4 illustrates how a microprocessor system would be programmed to carry out the method of the invention. Since microprocessor hardware suitable for implementing the functional blocks illustrated in FIG. 4 is well known, such hardware, which includes a central processing unit (CPU), permanent (ROM) and transfer (RAM) storage, interface chips, etc., is not shown.

Noise signals produced by a plurality of microphones **51*a*, or accelerometers 51*b*, or both are both positioned in the cabin of an aircraft 53, and vibration displacement signals produced by the AVMs are converted from analog form to digital form. See block 55**. The analog-to-digital conversion includes one or more steps to insure that the digital representation of the low rotor tone signal is periodic in the record length or ensemble. The engine speed sensor signal provides the information required for these steps to occur. The engine speed sensor signal also provides a means for generating a once per revolution TTL (transistor transitor logic) pulse that is used as a phase reference, indicating when the sampling is to begin. Thereafter, an order tracked fast-Fourier transformation (FFT) is performed on the digital signals resulting from the analog-to-digital (A/D) conversion. These steps are well known in the art of data acquisition as order tracking. Currently, the best order tracking method to be used in the practice of this invention is described in a paper by R. Potter and M. Gribler, *Computed Order Tracking Obsoletes Older Methods*, SAE Paper 891131, Noise and Vibration Conference, Traverse City, Mich., May 16–18, 1989.

Order tracking eliminates noise contained in the A/D converted signals that is non-synchronous to the rotational speed of the low-speed shaft 13 and obtains a measurement of the tone of the low-speed shaft with minimized discrete Fourier transform leakage. The tone is tracked over the RPM range of the engine over which noise is to be minimized. This could be the cruise RPM range, the hold RPM range, the take-off RPM range, the landing RPM range, or all of the RPM ranges over which the aircraft operates. The hereinafter-described influence coefficients have to be determined for a sufficient number of discrete points in the range of interest to make an actual embodiment of the invention viable.

Next, a test is made to determine if the balance weights on any of the aircraft engines have been changed. See block 57. In this regard, when the balance weights on the balance ring or rear blades of the low-pressure turbine of any of the aircraft engines is changed, the change is recorded in a memory (not shown) associated with a hereinafter-described maintenance access terminal (MAT) located on-board the aircraft. The block 57 test checks this memory to determine if any balance weight change has occurred since the last time the test was performed.

If a balance weight change has occurred, a series of influence coefficients designated $N_i^f$, $N_i^l$, $R_j^f$ and $R_j^l$ are updated. See block 58. $N_i^f$ is the noise influence coefficient at cabin location i due to a unit FAN imbalance; $N_i^l$ is the noise influence coefficient at cabin location i due to a unit LPT (low-pressure turbine) imbalance; $R_j^f$ is the AVM vibration influence coefficient at engine location j due to a unit FAN imbalance; and $R_j^f$ is the AVM vibration influence coefficient at engine location j due to a unit LPT imbalance, where FAN is incremental fan balance weight at incremental angular positions and LPT is incremental low-pressure turbine balance weight at incremental angular positions.

The influence coefficients are defined as the change in the related cabin response parameter (sound pressure or vibration) divided by the related change in engine balance. The responses, influence coefficients, and balances are all complex numbers. If a change in the balance of an engine has been made (and the data for at least one baseline engine run has been stored) at block 58, new influence coefficients corresponding to the change in balance are calculated. In this manner, the influence coefficients are continuously updated or refined each time a system formed in accordance with this invention is activated. Ideally, influence coefficients will not vary over time, or from aircraft to aircraft. In such instances, the influence coefficients can be loaded when an engine is installed and the update calculation sequence eliminated.

After being updated, the influence coefficients are stored in a suitable memory. See block 59.

If the engine balance weights have not changed, or after the updated influence coefficients have been computed and stored, the Fourier transformed signals derived from the noise signals produced by the microphones **51*a* or accelerometers 51*b* are used by an optimizing equation to separately determine for each engine a balance solution (e.g., fan and low-pressure turbine corrective weights and angular positions) that will minimize aircraft cabin noise at the locations of the microphones 51*a*, or accelerometers 51*b***, or both. The preferred form of the optimizing equation is:

$$C_i = C^*_i + N_i^f \cdot FAN + N_i^l \cdot LPT \tag{1}$$

where: $C_i$ is the predicted noise level at cabin location i; $C^*_i$ is the measured noise level at cabin location i; and the other factors are as defined above.

Equation (1) is solved for each engine separately. The solution to the equation can be found in many ways, the least elegant of which is the brute force exhaustive search method of four incremental do-loops on FAN weight size, FAN weight angular orientation, LPT weight size, and LPT weight angular orientation. The method used to find the solution is arbitrary, since the solution is unique. After the FAN and LPT corrective values (weight and angular location) that produce the lowest $C_i$ are derived, the balance solution values are used to predict (block 63) new engine vibration levels for all engines at the AVM accelerometer locations based on the formula:

$$D_j = D^*_j + R_j^f \cdot FAN + R_j^l \cdot LPT \tag{2}$$

where: $D_j$ is the predicted AVM vibration level at engine location j; $D^*_j$ is the measured AVM vibration level at engine location j; and the other factors are as defined above, FAN and LPT being the balance solution determined by optimizing Equation (1).

Next, a test is made to determine if the predicted new engine vibration levels at the AVM locations are above or below acceptable vibration levels. See blocks 65. If below acceptable vibration levels, a balance weight selection appropriate to the engine is made (block 66) and the result displayed on a maintenance access terminal (MAT). See block 67. Preferably, in addition to the corrective balance weight information, the predicted cabin noise reduction value and the predicted change in AVM levels is displayed.

If the predicted new engine vibration levels at the AVM locations are not below acceptable vibration levels, the optimizing Equation (1) is solved again with the constraint that the allowable AVM levels ($D_j$) lie below $D_a$, where $D_a$ is the allowable AVM vibration level. See block 68. Thereafter, the balance solution, i.e., the FAN and LPT corrective weight and angular position values derived from resolving the optimizing equation with this constraint are used to select balance weights for the type of engine on the aircraft 51 and the result displayed on the maintenance access terminal (MAT) display 69.

As will be readily appreciated from the foregoing description, the invention provides a method and apparatus that minimizes aircraft cabin noise produced by engine vibration. Rather than balancing engines to minimize engine vibration, the invention balances engines to minimize cabin noise. If necessary, limits are placed on the balancing solution that prevents the balancing solution from producing an output that could detrimentally unbalance the engines.

The invention incorporates an optimizing equation that is solved to determine the fan and low-pressure turbine corrective weights that minimize low rotor synchronous noise. The tone transmitted to the cabin that creates the noise is produced by the low-speed rotating systems of the aircraft engines. Order tracking is used to eliminate all noise that is non-synchronous with the tone produced by the low-speed rotating system and to get a measurement of the tone with minimized discrete Fourier transform leakage. The tone must be tracked over an RPM range of the engines that defines the control range over which noise is to be minimized. The engine RPM range may be the take-off range, the climb range, the cruise range, the descent range, the hold range or all RPM ranges over which the engines operate, or the RPM range over which the aircraft has a noise transmission/amplification problem. Obviously, a sufficient number of influence coefficients at discrete points in the control range must be gathered.

Each engine must be optimized separately. For a given engine, the necessary data is gathered when the other engine(s) is slightly retarded or advanced so that the engine tones do not overlap. While the easiest way to achieve this result is for the other engines to be operated out of the octave band of the engine providing the data, with order tracking this is not necessary. The RPM of the engines can remain much closer together. Order tracking with a sufficient number of averages eliminates the non-coherent contributions from other engines, provided the RPM of the other engines is not exactly the same as the RPM of the engine providing the data. The greater the RPM differential, the fewer averages required. Since the data collection period is rather brief, the RPM mismatch period is relatively brief. Thus, the data collection period has very little, if any, impact on normal aircraft operation.

The optimizing equation, in effect, predicts the noise that will be produced by a balance solution by summing noise created by the balance solution with monitored or detected noise. That is, the optimizing equation has the general form PCN=MCN+IC·CW, where PCN is the predicted cabin noise, MCN is the monitored cabin noise, IC is an influence coefficient, and CW is the correction weight (i.e., the balance solution).

While the presently preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A method of determining the corrective weight to be added to the rotating system of an engine driving a vehicle in order to minimize the noise in the cabin of the vehicle produced by the imbalance of the rotating system, said method comprising:

monitoring noise in the cabin of a vehicle to produce monitored cabin noise data that describes the noise in the cabin created by vibration of an engine driving the vehicle produced by the imbalance of the rotating system of the engine; and based on said monitored cabin noise data, determining a balance solution that defines the angular position and corrective balance weight to be added to the rotating system of the engine to minimize the noise in the cabin of the vehicle created by the vibration of the engine driving the vehicle produced by the imbalance of the rotating system of the engine.

2. The method claimed in claim 1 wherein determining a balance solution comprises solving an optimizing equation that predicts cabin noise by summing said monitored cabin noise data with corrective balance weight noise data obtained by incrementally changing said angular position and corrective balance weight until said predicted cabin noise is minimized.

3. The method claimed in claim 2 wherein said optimizing equation has the form: PCN=MCN+IC·CW where PCN is the predicted cabin noise; MCN is the monitored cabin noise data; and IC·CW is corrective balance weight noise data, where IC is an influence coefficient determined by dividing a change in noise response by a change in unbalance, and CW is the angular position and corrective weight.

4. The method claimed in claim 2 or 3 including:

using the balance solution determined by solving the optimizing equation to predict the vibration level of the engine if the balance solution is applied to the engine;

determining if the predicted engine vibration level is acceptable; and if acceptable, using the balance solution to select balance weights for the engine.

5. The method claimed in claim 4 including solving the optimizing equation a second time to determine an alternative balance solution if the predicted engine vibration is unacceptable, the optimizing equation solution being constrained by the acceptable vibration level; and using the alternative balance solution to select balance weights for the engine.

6. An apparatus for determining the corrective weight to be added to the rotating system of an engine driving a vehicle in order to minimize the noise in the cabin of the vehicle produced by the imbalance of the rotating system, said apparatus comprising:

a monitoring system including noise sensors for monitoring the noise in the cabin of the vehicle and producing monitored cabin noise data that describes the noise in the cabin of the vehicle created by the vibration of an engine driving the vehicle produced by the imbalance of the rotating system of the engine; and a calculating system coupled to said monitoring system for receiving the monitored cabin noise data and using the monitored cabin noise data to determine a balance solution that define the angular position and corrective weight to be added to the rotating system of the engine to minimize the noise in the cabin of the vehicle created by the vibration of the engine driving the vehicle produced by the imbalance of the rotating system of the engine.

7. The apparatus claimed in claim 6 wherein said balance solution is calculated by solving an optimizing equation that predicts cabin noise by summing said monitored cabin noise data with corrective balance weight noise data obtained by incrementally changing said angular position and corrective balance weight until said predicted cabin noise is minimized.

8. The apparatus claimed in claim 7 wherein said optimizing equation has the form: PCN=MCN+IC·CW, wherein PCN is predicted cabin noise; MCN is monitored cabin noise data; and IC·CW is corrective balance weight noise data, where IC is an influence coefficient determined by dividing a change in noise response by a change in unbalance, and CW is said angular position and corrective weight.

9. The apparatus claimed in claim 7 or 8 including a vibration monitoring system for monitoring the vibration of said engine produced by the imbalance of the rotating system of the engine and producing related monitored vibration data; and wherein said calculating system uses the balance solution determined by solving the optimizing equation and said monitored vibration data to predict the vibration produced by said rotating system if said balance solution is implemented, determines if the predicted rotating system vibration level is acceptable and, if acceptable, uses the balance solution to select balance weights for the engine.

10. The apparatus claimed in claim 9 wherein said calculating system solves the optimizing equation a second time to determine an alternative balance solution if the predicted rotating system vibration level is unacceptable, the optimizing equation solution being constrained by the acceptable vibration level, and uses the alternate balance solution to select balance weights for the engine.

11. A method of determining the corrective weight to be added to the low-speed rotating systems of the jet engines powering an aircraft in order to minimize the noise in the cabin of the aircraft created by an imbalance of the low-speed rotating systems of the jet engines, said method comprising the steps of:

monitoring the noise in the cabin of the aircraft to produce monitored cabin noise data that describes the noise in the cabin of the aircraft created by the vibration of the jet engines powering the aircraft produced by the imbalance of the low-speed rotating systems of the jet engines; and based on said monitored cabin noise data, determining a balance solution for each jet engine, that defines the angular position and corrective balance weights to be added to the jet engine to minimize the noise in the cabin of the aircraft created by the vibration of the jet engine produced by the imbalance of the low-speed rotating systems of the jet engine.

12. The method claimed in claim 11 wherein determining a balance solution comprises solving an optimizing equation that separately predicts cabin noise produced by each engine by summing said monitored cabin noise data for each jet engine with corrective balance weight noise data for each engine obtained by incrementally changing fan and low-pressure turbine weight and angular position values until said predicted cabin noise data produced by each engine is minimized.

13. The method claimed in claim 12 wherein said optimizing equation has the form:

$$C_i = C^*_i + N_i^f \cdot FAN + N_i^l \cdot LPT$$

where:

$C_i$ is the predicted noise level at location i in the cabin of the aircraft;

$C^*_i$ is the measured noise level at location i in the cabin of the aircraft;

$N_i^f$ is the noise influence coefficient at cabin location i due to a unit FAN imbalance;

$N_i^l$ is the noise influence coefficient at cabin location i due to a unit LPT imbalance;

FAN is the incremental fan weight imbalance at incremental angular positions; and LPT is the incremental low-pressure turbine weight imbalance at incremental angular positions.

14. The method claimed in claim 12 or 13 including monitoring the vibration of the low-speed rotating systems of said jet engines and producing monitored vibration data that describes the vibrations of the low-speed rotating systems of said jet engines and using the balance solutions determined by solving the optimizing equation and the monitored vibration data to predict the level of vibration produced by the engines if the balance solutions are implemented, determining if the predicted engine vibration levels are acceptable and, if acceptable, using the balance solutions to select balance weights for the engines.

15. The method claimed in claim 14 wherein using the balance solutions determined by solving the optimizing equation and the monitored vibration data to predict the level of vibration produced by the engines if the balance solutions are implemented comprise solving, for each engine, the equation:

$$D_j = D^*_j + R_j^f \cdot FAN\ R^l_j \cdot LPT$$

where:

$D_j$ is the predicted vibration level at engine location j;

$D^*_j$ is the monitored vibration data at engine location j;

$R_j^f$ is the vibration influence coefficient at engine location j due to a unit FAN imbalance; and $R^l_j$ is the vibration influence coefficient at engine location j due to a unit LPT imbalance.

16. The method claimed in claim 14 including solving the optimizing equation for each engine a second time to determine an alternative balancing solution if the, engine vibration levels are not acceptable, the optimizing equation solution being constrained by the, acceptable vibration level, and using the alternative balance solutions to select balance weights for the, engines.

17. The method claimed in claim 16 wherein using the balance solutions determined by solving the optimizing equation and the monitored vibration data to predict the level of vibration produced by the engines if the balance solutions are implemented comprises solving, for each engine, the equation:

$$D_j = D^*_j + R_j^f \cdot FAN + R_j^l \cdot LPT$$

where:

$D_j$ is the predicted vibration level at engine location j;

$D^*_j$ is the monitored vibration data at engine location j;

$R_j^f$ is the vibration influence coefficient at engine location j due to a unit FAN imbalance; and $R_j^l$ is the vibration influence coefficient at engine location j due to a unit LPT imbalance.

18. An apparatus for determining the corrective weight to be added to the low-speed rotating systems of the jet engines powering an aircraft to minimize the noise in the cabin of the aircraft created by an imbalance of the low-speed rotating systems of the jet engines, said apparatus comprising:

a monitoring system including noise sensors for monitoring the noise in the cabin of the aircraft to produce monitored cabin noise data that describes the noise in the cabin of the aircraft created by the vibration of the jet engines powering the aircraft produced by the imbalance of the low-speed rotating systems of the jet engines; and a calculating system coupled to said monitoring system for receiving the monitored cabin noise data and using the monitored cabin noise data to determine a balance solution for each jet engine that defines the angular position and corrective balance weights to be added to the low-speed rotating system of the jet engine to minimize the noise in the cabin of the aircraft created by the vibration of the jet engine produced by the imbalance of the low-speed rotating systems of the jet engine.

19. The apparatus claimed in claim 18 wherein said balance solution is calculated by solving an optimizing equation that separately predicts cabin noise by summing said monitored cabin noise data for each jet engine with corrective balance weight noise data for each engine obtained by incrementally changing fan and low-pressure turbine weight and angular position values until said predicted cabin noise data produced by each engine is minimized.

20. The apparatus claimed in claim 19 wherein said optimizing equation has the form:

$$C_i = C^*_i + N_i^f \cdot FAN + N_i^l \cdot LPT$$

where:

$C_i$ is the predicted noise level at location i in the cabin of the aircraft;

$C^*_i$ is the measured noise level at location i in the cabin of the aircraft;

$N_i^f$ is the noise influence coefficient at cabin location i due to a unit FAN imbalance;

$N_i^l$ is the noise coefficient at cabin location i due to a unit LPT imbalance;

FAN is the incremental fan weight imbalance at incremental angular positions; and LPT is the incremental low-pressure turbine weight imbalance at incremental angular positions.

21. The apparatus claimed in claim 19 or 20 including a vibration monitoring system for monitoring the vibration of the low-speed rotating systems of said jet engines and producing monitored vibration data that describes the vibrations of the low-speed rotating systems of said jet engines; and wherein said calculating means uses the balance solutions determined by solving the optimizing equation and the monitored vibration data to predict the level of vibration produced by the engines if the balance solutions are implemented, determines if the predicted engine vibration levels are acceptable and, if acceptable, uses the balance solutions to select balance weights for the engines.

22. The apparatus claimed in claim 21 wherein the calculating system predicts the level of vibration produced by the engines if the balance solutions are implemented by solving, for each engine, the equation:

$$D_j = D^*_j + R_j^f \cdot FAN + R_j^l \cdot LPT$$

where:

$D_j$ is the predicted vibration level at engine location j;

$D^*_j$ is the monitored vibration data at engine location j;

$R_j^f$ is the vibration influence coefficient at engine location j due to a unit FAN imbalance; and $R_j^l$ is the vibration influence coefficient at engine location j due to a unit LPT imbalance.

23. The apparatus claimed in claim 19 wherein the calculating system solves the optimizing equation for each engine a second time to determine an alternative balancing solution if the engine vibration levels are not acceptable, the optimizing equation solution being constrained by the acceptable vibration level, and uses the alternative balance solution to select balance weights for the engines.

24. The apparatus claimed in claim 23 wherein the calculating system predict the level of vibration produced by the engines if the balance solutions are implemented by solving, for each engine the equation:

$$D_j = D^*_j + R_j^f \cdot FAN + R_j^l \cdot LPT$$

where:

$D_j$ is the predicted vibration level at engine location j;

$D^*_j$ is the monitored vibration data at engine location j;

$R_j^f$ is the vibration influence coefficient at engine location j due to a unit FAN imbalance; and $R_j^l$ is the vibration influence coefficient at engine location j due to a unit LPT imbalance.

* * * * *

UNITED STATES PATENT AND TRADEMARK OFFICE

CERTIFICATE OF CORRECTION

PATENT NO. : 5,586,065

DATED : December 17, 1996

INVENTOR(S) : M.H. Travis

It is certified that error appears in the above-indentified patent and that said Letters Patent is hereby corrected as shown below:

On the title page, item:

| | | |
|---|---|---|
| [56] Pg. 1, col. 1 | Refs. Cited (U.S. Pat. Docs., Item 3) | "4,238,960 2/1980" should read --4,238,960 12/1980-- |
| Pg. 1, col. 2 | Assistant Examiner | "Hal P. Wachsman" should read --Hal D. Wachsman-- |
| 11 (Claim 6, | 10 line 15) | "define" should read --defines-- |
| 11 (Claim 11, | 60 line 14) | After "engines" delete "," |
| 12 (Claim 15, | 41 line 5) | "comprise" should read --comprises-- |
| 12 (Claim 15, | 44 line 7) | Between "FAN" and "$R_j^1$" insert --+-- |
| 12 (Claim 16, | 55 line 3) | After "the" delete "," |

UNITED STATES PATENT AND TRADEMARK OFFICE

CERTIFICATE OF CORRECTION

PATENT NO. : 5,586,065

DATED : December 17, 1996

INVENTOR(S) : M.H. Travis

It is certified that error appears in the above-indentified patent and that said Letters Patent is hereby corrected as shown below:

| | | |
|---|---|---|
| 12 (Claim 16, | 57 line 5) | After "the" delete "," |
| 12 (Claim 16, | 59 line 7) | After "the" delete "," |

Signed and Sealed this

First Day of July, 1997

Attest:

BRUCE LEHMAN

*Attesting Officer* *Commissioner of Patents and Trademarks*